United States Patent [19]
Boll

[11] Patent Number: 4,517,620
[45] Date of Patent: May 14, 1985

[54] ELECTRICAL FEED AND CONTROL CIRCUIT FOR THE PUMP PISTON OF A SPRAY GUN

[75] Inventor: Hans-Joachim Boll, Markdorf, Fed. Rep. of Germany

[73] Assignee: J. Wagner GmbH, Fed. Rep. of Germany

[21] Appl. No.: 422,281

[22] Filed: Sep. 23, 1982

[30] Foreign Application Priority Data

Oct. 6, 1981 [DE] Fed. Rep. of Germany ....... 3139724

[51] Int. Cl.$^3$ ............................................ H01H 47/32
[52] U.S. Cl. .................... 361/154; 361/156; 361/205; 361/235; 323/327
[58] Field of Search ............ 361/205, 154, 155, 156, 361/152, 185, 235; 323/327, 905, 217

[56] References Cited

U.S. PATENT DOCUMENTS 3,614,543 10/1971 Dick ..................................... 361/154
3,893,019 7/1975 King et al. .......................... 323/327

OTHER PUBLICATIONS

"Triggerless Phase Control Circuit for Sensitive Gate Triacs", RCA Technical Notes, RCA TN No. 715, Jun. 1967.
Tietze et al., "Halbleiter-Schaltungstechnik", Springer, Verlag, Berlin, Heidelberg, New York, 1971, pp. 572–581.

Primary Examiner—Reinhard J. Eisenzopf
Attorney, Agent, or Firm—Hill, Van Santen, Steadman & Simpson

[57] ABSTRACT

An electrical feed and control circuit for a drive arrangement of the pump piston of a spray gun which comprises a coil and an oscillating armature, employs an input for connection to an alternating current network, an output leading to the oscillating armature coil, a half-wave suppression circuit optionally connectible by way of a transfer switch, a phase-angle control circuit connectible and disconnectible by the transfer switch in common with the half-wave suppression circuit, the phase-angle circuit including a timing element comprising a fixed resistor and a capacitor, and a second phase-angle circuit -having a timing element containing a variable resistor. In one switch position of the switch, the current path extends through the second phase-angle circuit and in the other switch position extends through the half-wave suppression circuit and the first phase-angle circuit so that the phase-angle is variable in the one switch position whereas, in the other switch position a fixed phase angle is provided and the stroke frequency of the pump piston is cut in half.

11 Claims, 2 Drawing Figures

ELECTRICAL FEED AND CONTROL CIRCUIT FOR THE PUMP PISTON OF A SPRAY GUN

BACKGROUND OF THE INVENTION

1. Field of the Invention

The present invention relates to an electrical feed and control circuit for a drive arrangement of the pump piston of a spray gun which comprises a coil and an oscillating armature, an input for connection to an alternating current network, an output leading to the oscillating armature coil, a half-wave suppression circuit selectively connectible by way of a transfer switch, and a phase control circuit which can be connected and disconnected by the transfer switch together with the half-wave suppression circuit, the phase control circuit being provided with a timing element including a fixed resistor and a capacitor.

2. Description of the Prior Art

In spray guns having a pump piston driven by an oscillating armature, the oscillating armature coil is essentially connected directly at the alternating current network, this leading the fact that the pump piston executes 6000 stroke/min. By way of a corresponding design of the overall arrangement, particularly of the oscillating armature, pump piston, pull-back spring, nozzle, etc, is that the atomization is very good for a prescribed, maximum paint throughput of the gun, i.e. the paint is finely atomized. However, a satisfactory fine atomization also occurs when the paint feed is throttled, the paint throughput is therefore reduced. Expressed in other terms, the degree of atomization remains essentially the same over a specific paint throughput range. However, a disadvantage with these known paint spray guns is that they must work with a high piston frequency of 6000 strokes/min even with a throttled paint throughput, i.e. must work at a piston frequency which leads to wear and to rather considerable noise. Therefore, the spray guns have appeared on the market in which the piston frequency can be selectively reduced from 6000 to 3000 stroke/min, i.e. for low amounts of paint throughput. This halving of the frequency occurs in such a manner that a feed and control circuit is provided between the network and the oscillating armature coil, the feed control circuit containing a half-wave suppression circuit which suppresses the half-waves of one polarity of the alternating current. However, satisfactory results have not been achieved with such an arrangement, this being attributable to the fact that the overall arrangement, of course, is optimized for operation of 6000 stroke/min and, therefore, with a halving of the overall amount of paint ejected given the same nozzle size, a considerable deterioration of the quality of atomization occurs. Moreover, the increase of peak and effective current necessarily occurring from the half-wave suppression leads to a considerable heating of the oscillating armature coil. In order to produce an improvement in this respect, a spray gun has already been disclosed in which, together with the transfer to operation having 3000 stroke/min, a phase-angle control of the remaining half-waves is carried out. In addition to the half-wave suppression circuit, the feed and control circuit therefore contains a timing element comprising fixed resistors and a capacitor. The phase-angle control during operation at 3000 stroke/min effects a reduction of the output of the device and therefore reduces the danger of overheating of the oscillating armature coil. A good atomization quality even given this mode with reduced frequency can be achieved, moreover, by a suitable dimensioning of the (fixed) size of the phase-angle control.

However, all described, known devices share the disadvantage that the operator has no possibility of significantly changing the degree of atomization, in particular independently of the amount ejected. In particular, practice is not such that a superfine atomization (high degree of atomization) is always desirable; on the contrary, there are often instances in which atomization in coarser particles or even a so-called wet stream is desirable; therefore, particularly when spraying with pesticides, a coarser atomization is preferable to a superfine atomization (fog-like cloud).

SUMMARY OF THE INVENTION

It is therefore the object of the invention to improve the feed and control circuit of the type generally set forth above in such a manner that, in addition to the frequency transfer, the possibility occurs of also being able to alter the degree of atomization of the paint sprayed by the spray gun over a wide range as desired.

The above object is achieved, according to the present invention, in an electrical feed and control circuit for a driver arrangement of the pump piston of a spray gun comprising a coil and an oscillating armature, an input for connection to an alternating current network, an output leading to the oscillating armature coil, a half-wave suppression circuit selectively connectible by way of a transfer switch, a phase-angle circuit connectible and disconnectible by the transfer switch, with the half-wave suppression circuit, the phase-angle circuit including a timing element comprising a fixed resistor and a capacitor, and which is characterized by a second phase-angle circuit having a timing element including a variable resistor, whereby, in one switch position of the transfer switch, the current paths extends through the second phase-angle circuit and, in the other switch position, leads through the half-wave suppression circuit and the first phase-angle circuit.

Therefore, the circuit of the present invention contains a second timing element having a variable resistor so that the time constant of the timing element and, therefore, the size of the phase-angle control are variable, resulting in a change of the degree of atomization. Therefore, the operator can choose between operation with 6000 stroke/min and 3000 strokes/min, can (mechanically) vary the amount of throughput within wide limits and, in addition, can electronically set the desired degree of atomization between superfine atomization and wet stream without problems arising relating to overheating of the oscillating armature coil, overload of the oscillating armature, and overtaxing of the pull-back spring.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic circuit diagram of a circuit constructed in accordance with the present invention configured in a switch position corresponding to operation of the oscillating armature and, therefore, of the pump piston, at 6000 stroke/min; and FIG. 2 is a schematic circuit diagram of the same circuit of FIG. 1 configured in a switch position corresponding to operation of the oscillating armature of 3000 strokes/min.

DESCRIPTION OF THE PREFERRED EMBODIMENTS

Figure 1:
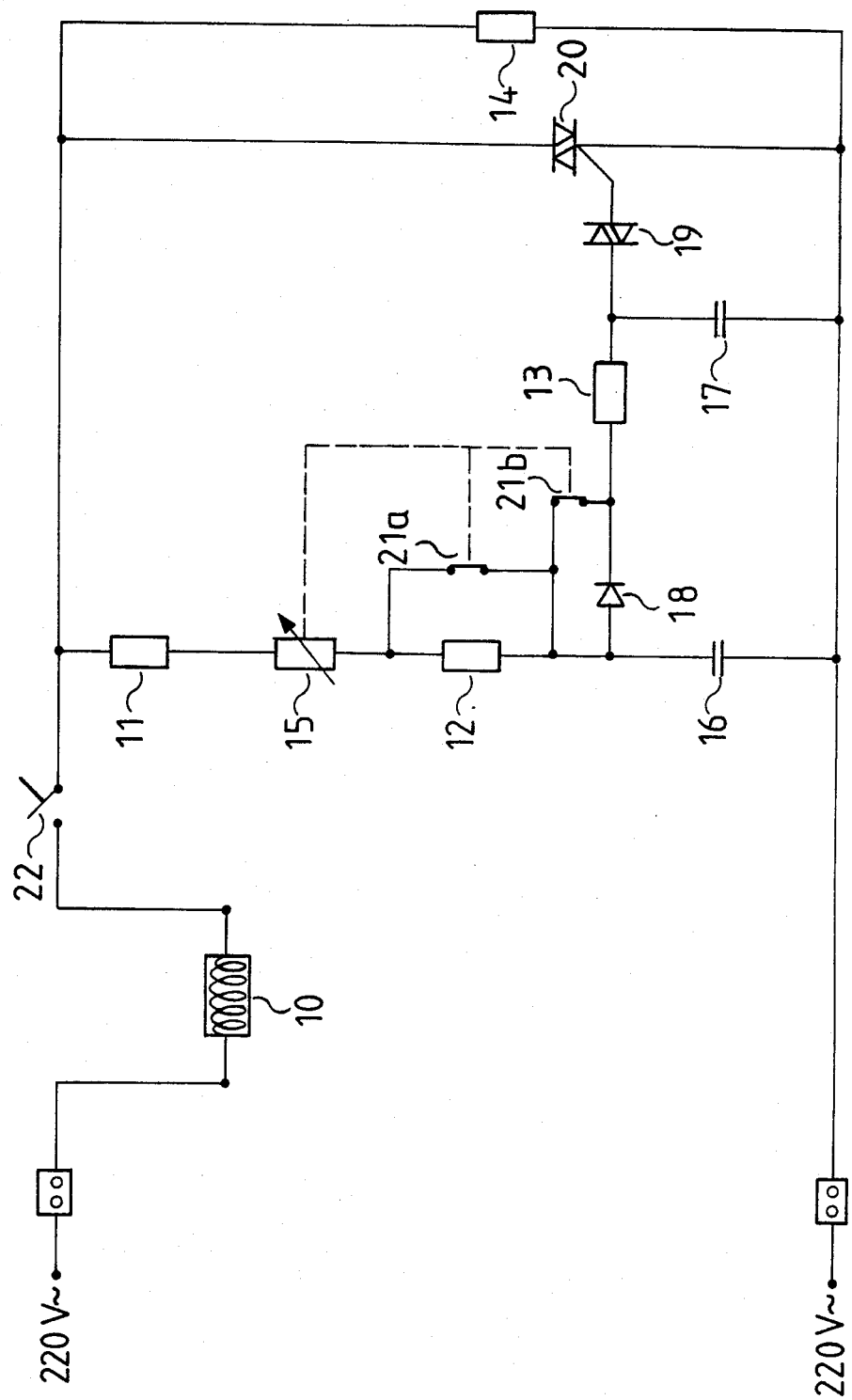

Referring to the drawings, the circuit has terminals for connection to a conventional alternating current network (for example 220 V, 50 Hz) and a coil 10 represents the coil of the oscillating armature for the drive of the pump piston of the spray gun which is to be fed and to be controlled by the circuit. The circuit essentially comprises four fixed resistors 11, 12, 13 and 14, a variable resistor, in particular a potentiometer 15, two capacitors 16 and 17, a diode 18, a diac 19, a triac 20, two switches 21a and 21b mechanically connected to one another, and a main switch 22 (on/off switch). The interconnection of these components is clearly illustrated in FIGS. 1 and 2.

The components have the following functions. The main switch 22 serves for switching the overall circuit on and off can be actuated by a switch button located on the spray gun. The two switches 21a and 21b, mechanically connected to one another, are connected in common to the potentiometer 15 which has a bipolar rotary switch which is located on the gun, and serve for switching the device from 6000 strokes/min to 3000 strokes/min or, respectively, vice versa. The bipolar rotary switch also serves as an actuation element for the adjustment of the potentiometer 15, whereby the connection of the rotary switch is undertaken in such a manner that the switches 21a, 21b are closed in its one switch position (FIG. 1) and the resistance value of the potentiometer is variable over the entire potentiometer range in response to turning of the knob; in contrast whereto, the switches 21a, 21b are opened in the other switch position and the potentiometer represents a fixed resistor having a resistance value corresponding to the maximum resistance of the potentiometer. Given operation at 6000 strokes/min (switches 21a, 21b closed, FIG. 1), the potentiometer 15, together with the resistor 11 and the capacitor 16 represent a timing element having a variable time constant. Given operation at 3000 strokes/min (switches 21a, 21b closed, FIG. 2), the diode 18 functions to suppress the negative half-waves, whereby, given this mode of operation, the resistors 11 and 12, and the potentiometer 15 representing a fixed resistor, and the capacitor 16 represent a timing element having a fixed time constant. The triac 20 serves as a controllable power switch element for executing the phase-angle control and the diac 19 serves to increase the trigger reliability of the triac 20. Finally, the resistor 13 and the capacitor 17 serve to reduce the switch hysteresis.

Figure 2:
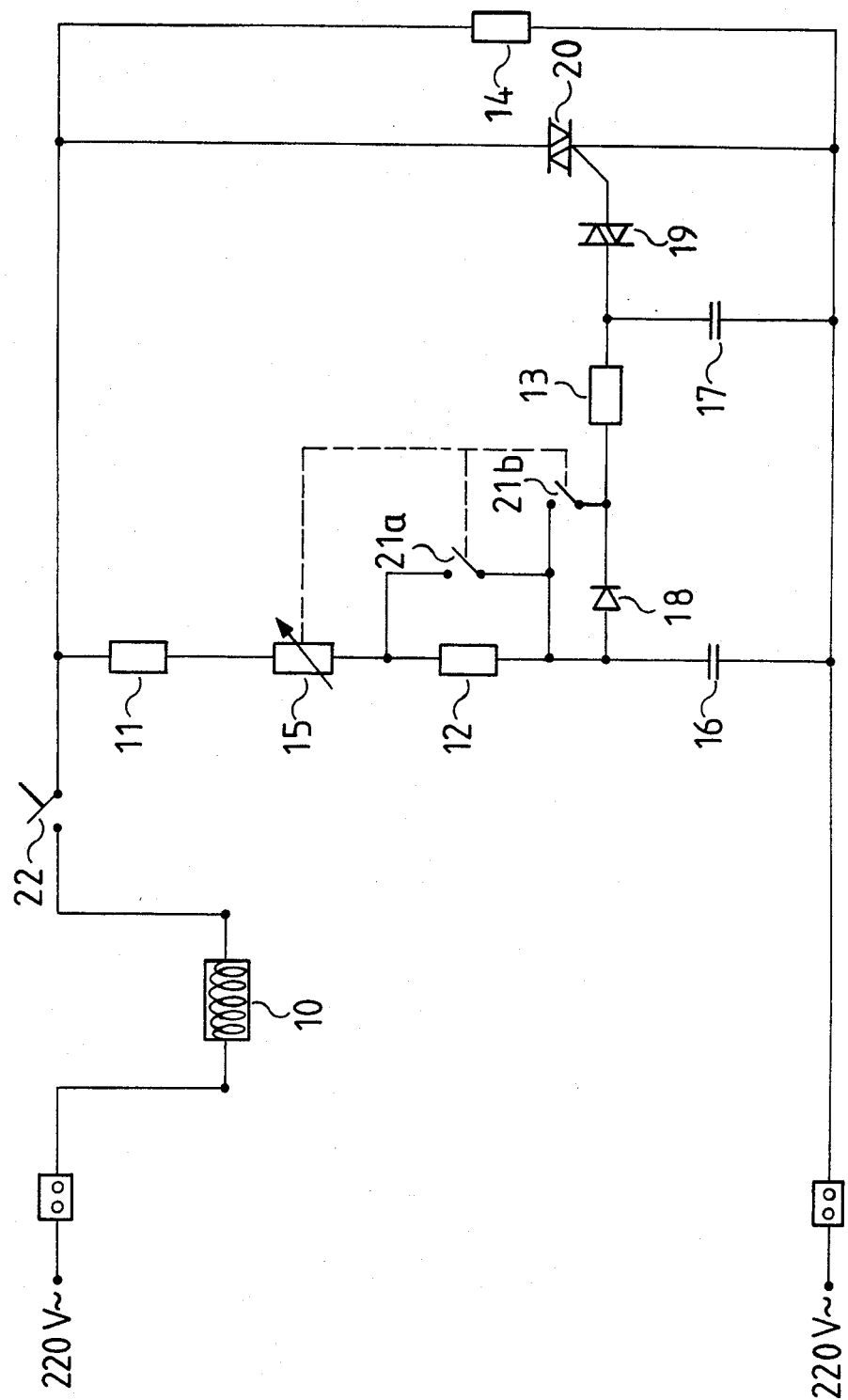

When, given the position of the switches 21a, 21b illustrated in FIG. 1, the main switch 22 is closed, then the alternating current flows through the circuit unimpeded, i.e. no half-wave suppression occurs. Therefore, the coil 10 is excited at a frequency of 6000 strokes/min and the oscillating armature and pump piston are thus driven at this frequency. However, the triggering of the triac 20 for each half-wave of the alternating current occurs with a certain time delay whose length is provided by the timing element 11, 15, 16. The time constant of the timing element can therefore be varied by a turning of the rotatable knob of the bipolar rotary switch and, therefore, by adjusting the resistance value of the potentiometer 15, whereby the time delay, and therefore, the phase-angle control is the least when the potentiometer is set to its minimum resistance value, generally the value zero, whereas the time delay and, therefore, the phase-angle control are greatest when the potentiometer 15 is set to its maximum resistance value. Therefore, the phase-angle control given this mode of operation at 6000 strokes/min can be continuously varied over a certain range by setting the potentiometer 15, this resulting in a change of the degree of atomization of the liquid placed under pressure by the pump piston and sprayed through the atomizer jet of the spray gun. Thereby, with a given atomizer jet, the atomization is all the finer the lower the phase-angle control, and is all the greater the greater the phase angle control.

When the bipolar rotary switch is now switched to its other position, then the switches 21*a* and 21*b* (FIG. 2) open and, at the same time, the resistance value of the potentiometer 15, independently of the rotary position of the rotary knob, is set to its maximum value, so that the potentiometer 15 now represents a fixed resistor. Thereby, opening the switches 21*a* and 21*b* causes suppression of each other half-wave of the alternating current, namely the negative half-wave. The consequence of this is that the coil 10 is now only excited with half the frequency, the oscillating armature and pump piston therefore now only operates at 3000 strokes/min. Thereby, the triac 20 is also triggered with a time delay, namely on the basis of the timing element 11, 12, 15 and 16. This timing element, however, comprises a fixed time constant because, as mentioned, the potentiometer 15 now operates as a fixed resistor whose resistance value is equal to the maximum resistance of the potentiometer. Therefore, even given this mode of operation at 3000 strokes/min, a phase-angle control occurs which, however, is not variable, but constant.

As an non-limiting example, and in order to provide an easier understanding of the invention, numerical values are set forth below for the circuit just described, but do not represent any restriction whatsoever of the scope of the invention. Therefore, the circuit elements in a very specific exemplary embodiment are dimensioned as follows:

| | |
|---|---|
| Resistor 11 | 1 kΩ |
| Resistor 12 | 10 kΩ |
| Resistor 13 | 4.7 kΩ |
| Resistor 14 | 39 kΩ |
| Potentiometer 15 | 0–100 kΩ |
| Capacitor 16 | 0.1 μF |
| Capacitor 17 | 0.01 μF |

Given the above exemplary embodiment, the timing element has a time constant between approximately 0.2 and 2.0 msec in the operating mode of 6000 strokes/min, this corresponding to a phase-angle control between 3° and 36° given a alternating current frequency of 50 Hz. Given operation of 3000 strokes/min, the time constant of the timing element amounts to approximately 5.5 msec, this corresponding to a phase-angle control of 100°.

In practicing the present invention, it is possible for the operator of the spray gun to select the degree of atomization at will given operation at 6000 strokes/min, in particular by turning the potentiometer rotary knob from superfine atomization (resistance value of potentiometer equals zero, minimum phase-angle control) up to a moistening, coarse atomization (potentiometer at the highest resistance value, maximum phase-angle control). Thereby, this selection of the degree of atomization can occur for any, mechanically set, liquid (paint) throughput, whereby the amount of liquid can generally be throttled from 100% up to approximately 35%.

However, the operator can also change the mode of operation at 3000 strokes/min, whereby the paint throughput is reduced to 50% and can be mechanically throttled up to 20%, namely given continued fine atomization (constant phase-angle control); this operating mode offers the advantage that the creation of noise is at a minimum. Thereby, the following should be pointed out. Whereas, given operation at 6000 strokes/min, for which operating mode, the pump and atomizer arrangement is mechanically designed, a fine atomization is achieved without or, respectively, with a minimum phase-angle control and the atomization is all the coarser the higher the phase-angle control, namely largely independently of the paint throughput, operation at 3000 strokes/min, for which the device is not mechanically designed per se, is such that the fine atomization requires a considerable phase-angle control which is generally greater than that which, at 6000 strokes/min, already leads to a wetting stream.

The circuit of the present invention can also be incorporated without difficulty in small hand spray guns, for example in the manner of a bottom plate.

The invention can be subject to numerous modifications. Therefore, differing from the illustrated exemplary embodiment, for example, the two timing elements can be completely separate from one another in terms of elements. It is also possible to attach separate switch knobs to the gun for adjusting the potentiometer and for switching the switches 21a, 21b. Further, the circuit can also be desiged in such a manner that the possibility of changing the degree of atomization likewise occurs given operation at 3000 strokes/min, whereby, in this case, the timing element assigned to the operating mode at 3000 strokes/min, similar to the timing element for the operating mode at 6000 strokes/min, must contain a resistor having a variable resistance value so that the phase-control and, therefore, the degree of atomization are variable. Finally, the mentioned electronic components such as diodes, triacs and diacs can be replaced by other electronic components operating identically or, respectively, equivalently.

It is to be understood that reference has been made to paint in the foregoing for the sake of simplicity and that the use of any other sprayable medium is to be understood.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In an electrical feed and control circuit for a drive arrangement, including a coil and an oscillating armature, of a pump piston of a spray gun in which control circuit an input is provided for connection to an alternating current source, and output means is connected to the coil, a half-wave suppressor is selectively connectible to the output means by way of a two-position switch device, and a phase-angle control constituting a first phase-angle control is connectible and disconnectible by way of the switch device, the first phase-angle control comprising a timing element including a fixed resistor and a capacitor, the improvement comprising:
    a second phase-angle control including an additional timing element comprising a variable resistor and the capacitor of the first phase-angle control;
    said second phase-angle control connected to the switch device connected in a first switch position in a current path to the output means bypassing the half-wave suppressor and in a second switch position in a current path to the output means through the first phase-angle control and the half-wave suppressor.

2. The improvement of claim 1, wherein the output means comprises:
    a triac common to both of the phase-angle controls; and
    wherein said half-wave suppressor comprises a diode.

3. The improvement of claim 2, wherein said variable resistor comprises:
    a potentiometer including a bipolar rotary switch mechanically connected to the switch device and having a rotatable knob and operable in one position of said rotary switch to close the switch device and vary the resistance value of said potentiometer via rotation of said knob, and operable in the other position of said rotary switch to open the switch device and hold the resistance value of said potentiometer at a fixed value.

4. The improvement of claim 3, wherein said potentiometer is held at its maximum resistance value when said rotary switch is in said other position.

5. The improvement of claim 4, wherein said improvement further comprises:
    at least one resistor connected to the switch device and at least one capacitor connected thereto for reducing switch hysteresis.

6. The improvement of claim 5, wherein said improvement further comprises:
    a diac connected between the junction of said one resistor and said one capacitor and said triac to increase ignition reliability.

7. The improvement of claim 1, wherein said timing elements are interconnected and commonly share a plurality of components.

8. An electrical feed and control circuit for a drive arrangement which includes a two-terminal coil and an oscillatory armature operated by the coil, comprising:
    first and second input terminals for connection to a source of alternating current, one terminal of the coil connected to said first input terminal;
    an on/off switch connected to the other terminal of the coil;
    a triac including a first terminal connected to said on/off switch, a second terminal connected to said second input terminal, and an ignition terminal;
    a series circuit connected to the triac side of said on/off switch and to said second input terminal, said series circuit including
        a first resistor connected to said on/off switch,
        a second resistor connected to said first resistor,
        a third resistor connected to said second resistor and a capacitor connected between said third resistor and said second input terminal,
        said second resistor comprising a potentiometer including a bipolar rotary switch with a rotary knob, which fixes the resistance of said potentiometer in one switch position and, in the other switch position permits varying of the resistance value in response to rotation of said knob;

a half-wave suppressor connected between said ignition terminal of said triac and the junction of said third resistor and said capacitor; and a switch device including first contacts connected across said third resistor, second contacts connected across said half-wave suppressor, and connected to and operated by said bipolar switch, said first and second contacts open in response to operation of said rotary switch to said one switch position to establish a first timing circuit including said first, second and third resistors and said capacitor and having a first time constant and connected via said half-wave suppressor to said ignition terminal of said triac to energize the coil at a fixed frequency, said first and second contacts closed in response to operation of said rotary switch to said other switch position to shunt said third resistor and said half-wave suppressor and establish a second timing circuit including said first and second resistors and said capacitor and having a shorter, second time constant to energize the coil at a frequency determined by the resistance setting of said potentiometer.

9. The circuit of claim 8, wherein said half-wave suppressor comprises a diode.

10. The circuit of claim 9, and further comprising:

a hysteresis reduction circuit for said switch device including a fourth resistor connected to said second contacts and a second capacitor connected between said fourth resistor and said second input terminal.

11. The circuit of claim 10, and further comprising: a diac connected between said fourth resistor and said triac ignition terminal to increase ignition reliability.

* * * * *